US 8,520,627 B2

(12) United States Patent
Park

(10) Patent No.: US 8,520,627 B2
(45) Date of Patent: Aug. 27, 2013

(54) METHOD OF CONDUCTING HANDOVER OF MOBILE NODE, AND NETWORK SYSTEM USING THE SAME

(75) Inventor: Soo-hong Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 821 days.

(21) Appl. No.: 11/444,513

(22) Filed: Jun. 1, 2006

(65) Prior Publication Data

US 2006/0291421 A1    Dec. 28, 2006

(30) Foreign Application Priority Data

Jun. 28, 2005 (KR) .................. 10-2005-0056443

(51) Int. Cl.
*H04W 4/00* (2009.01)

(52) U.S. Cl.
USPC ........... 370/331; 370/332; 370/333; 370/334; 455/436; 455/437; 455/438; 455/439; 455/440; 455/441; 455/442; 455/443; 455/444

(58) Field of Classification Search
USPC ................ 455/436, 437, 438, 439, 440, 441, 455/442, 443, 444; 370/331, 332, 333, 334
See application file for complete search history.

(56) References Cited

U.S. PATENT DOCUMENTS

| 5,668,880 | A * | 9/1997 | Alajajian | 370/342 |
|---|---|---|---|---|
| 5,953,320 | A * | 9/1999 | Williamson et al. | 370/252 |
| 6,009,326 | A * | 12/1999 | Roder et al. | 455/436 |
| 6,246,638 | B1 * | 6/2001 | Zook et al. | 367/140 |
| 6,246,876 | B1 * | 6/2001 | Hontzeas | 455/436 |
| 6,285,880 | B1 * | 9/2001 | Gagnon et al. | 455/432.1 |
| 6,788,681 | B1 * | 9/2004 | Hurren et al. | 370/389 |
| 7,215,960 | B2 * | 5/2007 | Sliva | 455/436 |
| 2002/0060995 | A1 | 5/2002 | Cervello et al. | |
| 2002/0188723 | A1 | 12/2002 | Choi et al. | |
| 2004/0005894 | A1 | 1/2004 | Trossen et al. | |
| 2006/0099948 | A1 * | 5/2006 | Hoghooghi et al. | 455/436 |
| 2006/0159047 | A1 * | 7/2006 | Olvera-Hernandez et al. | 370/331 |
| 2006/0221899 | A1 * | 10/2006 | Feder et al. | 370/331 |
| 2006/0291421 | A1 | 12/2006 | Park | |

FOREIGN PATENT DOCUMENTS

| EP | 1 237 334 | 9/2002 |
|---|---|---|
| JP | 2002-314567 | 10/2002 |
| JP | 2008-544633 | 12/2008 |
| KR | 2005-18136 | 2/2005 |

(Continued)

OTHER PUBLICATIONS

Office Action issued in Korean Patent Application No. 2005-56443 on Oct. 31, 2007.

(Continued)

*Primary Examiner* — Steve D Agosta
(74) *Attorney, Agent, or Firm* — Staas & Halsey LLP

(57) ABSTRACT

An apparatus and method relates to transmission of media independent (MIH) handover protocol information, the access point includes a wired interface module to receive, through a wired network, indication information indicating whether an access point that manages a neighboring heterogeneous subnet supports a protocol to conduct a media independent handover (MIH), a storage module to store the received indication information, a frame generating module to generate a frame including the stored indication information, and a wireless interface module to transmit the generated frame to a mobile node.

9 Claims, 6 Drawing Sheets

(56) References Cited

FOREIGN PATENT DOCUMENTS

| KR | 20-417770 | 6/2006 |
|---|---|---|
| WO | 2005/011134 A2 | 2/2005 |
| WO | 2007/001147 A1 | 1/2007 |

OTHER PUBLICATIONS

Written Opinion issued in International Application No. PCT/KR2006/002484 on Jul. 3, 2007.

"Media Independent Handover", IEEE 802/21 Media Independent Handover Services, May 2005, pp. 90-100.

Japanese Office Action issued May 28, 2010 in corresponding Japanese Patent Application 2008-516763.

Japanese Office Action mailed Feb. 28, 2012 issued in corresponding Japanese Patent Application No. 2011-085690.

Joint Harmonized Contribution, "Media Independent Handover", IEEE 802.21 Media Independent Handover Services, May 2005, pp. 27, 104-106.

Joint Harmonized Contribution, "Media Independent Handover", IEEE 802.21 Media Independent Handover Services, May 2005, pp. 91-101.

Extended European Search Report dated Mar. 30, 2012 issued in corresponding European Patent Application No. 06769061.0.

Alan Carlton et al., "Media Independent Handover Functions and Services Specifications", IEEE 802.21 Media Independent Handover, Jan. 2005, pp. 1-80.

Michael Hoghooghi et al., "Optimal Beacon & Architecture for MIH", IEEE 802.21 Media Independent Handover, Jan. 2005, slides 1-33.

Xiaoyu Liu et al., "Initial Proposal to IEEE 802.21 from Samsung", IEEE 802.21 Media Independent Handover, Jan. 2005, pp. 1-42.

\* cited by examiner

FIG. 6

| Type value b3 b2 | Type description | Subtype value b7 b6 b5 b4 | Subtype description |
|---|---|---|---|
| 00 | Management | 0000 | Association request |
| 00 | Management | 0001 | Association response |
| 00 | Management | 0010 | Reassociation request |
| 00 | Management | 0011 | Reassociation response |
| 00 | Management | 0100 | Probe request |
| 00 | Management | 0101 | Probe response |
| 00 | Management | 0110–0111 | Reserved |
| 00 | Management | 1000 | Beacon |
| 00 | Management | 1001 | Announcement traffic indication message (ATIM) |
| 00 | Management | 1010 | Disassociation |
| 00 | Management | 1011 | Authentication |
| 00 | Management | 1100 | Deauthentication |
| 00 | Management | 1101–1111 | Reserved |
| 01 | Control | 0000–1001 | Reserved |
| 01 | Control | 1010 | Power Save (PS)-Poll |
| 01 | Control | 1011 | Request To Send (RTS) |
| 01 | Control | 1100 | Clear To Send (CTS) |
| 01 | Control | 1101 | Acknowledgment (ACK) |
| 01 | Control | 1110 | Contention-Free (CF)-End |
| 01 | Control | 1111 | CF-End + CF-Ack |
| 10 | Data | 0000 | Data |
| 10 | Data | 0001 | Data + CF-Ack |
| 10 | Data | 0010 | Data + CF-Poll |
| 10 | Data | 0011 | Data + CF-Ack + CF-Poll |
| 10 | Data | 0100 | Null function (no data) |
| 10 | Data | 0101 | CF-Ack (no data) |
| 10 | Data | 0110 | CF-Poll (no data) |
| 10 | Data | 0111 | CF-Ack + CF-Poll (no data) |
| 10 | Data | 1000–1111 | Reserved |
| 11 | Reserved | 0000–1111 | Reserved |

METHOD OF CONDUCTING HANDOVER OF MOBILE NODE, AND NETWORK SYSTEM USING THE SAME

CROSS-REFERENCE TO RELATED APPLICATION

This application claims the benefit of Korean Patent Application No. 2005-56443 filed on Jun. 28, 2005 in the Korean Intellectual Property Office, the disclosure of which is incorporated herein by reference.

BACKGROUND OF THE INVENTION

1. Field of the Invention

An aspect of the present invention is directed to handover in a wireless LAN environment. More particularly, an aspect of the present invention relates to a method for providing information as to whether media independent handover (MIH) services as defined by the Institute of Electrical and Electronics Engineers (IEEE) 802.21 specification are available for use in a network to which a mobile node belongs, and an access point performing the method.

2. Description of the Related Art

A rapid increase of users of mobile communication services has led to activation of mobile communication services supporting multimedia communications, and seamless communication services have been requested by mobile users. Accordingly, it has become important to achieve a fast handover in the wireless LAN environment based on the IEEE 802.11 specification.

FIG. 1 illustrates a conventional wireless LAN environment.

Referring to FIG. 1, the wireless LAN environment includes a mobile node (MN) 1, an access point (AP) A 10, an access point B 20, an access point C 30, an access point D 40, an access router (AR) A 50 and an access router B 60.

The mobile node 1, which can be a mobile phone, a personal digital assistant (PDA), or a notebook computer, moves between several wireless LANs. Each of the access points A, B, C and D 10, 20, 30 and 40 connects the mobile node 1 to a subnet to which the mobile node 1 belongs, thereby allowing the mobile node 1 to access a wired network like the Internet. Hereinafter, a device performing this role will be called an "access point."

The access routers A and B 50 and 60 provide the mobile node 1 with routing services in a subnet to which each of them belongs, thereby allowing the mobile node 1 to access an arbitrary node in the subnet using an optimal path.

As illustrated in FIG. 1, the conventional wireless LAN environment will be described under the assumption that the mobile node 1 passes through a basic service set (BSS) managed by the access point A 10, a BSS managed by the access point B 20, a BSS managed by the access point C 30 and a BSS managed by the access point D 40 in sequence. BSS is a term used in the IEEE 802.11 specification, and it refers to a wireless LAN managed by a single access point.

In order to allow the moving mobile node 1 to know which access point to use for accessing a wired network, each of the access points A, B, C and D 10, 20, 30 and 40 periodically transmits a beacon signal that indicates its managed BSS.

In communications denoted by 11 in FIG. 1, the mobile node 1 receives a beacon signal from the access point A 10. Based on the received beacon signal, the mobile node 1 becomes aware that it is positioned in the BSS managed by the access point A. The mobile node 1 accesses a wired network by way of the access point A 10, as it did previously.

In communications denoted by 21 in FIG. 1, the mobile node 1 receives a beacon signal from the access point B 20. Based on the received beacon signal, the mobile node 1 becomes aware that the BSS in which it is positioned has changed. Accordingly, the mobile node 1 conducts a handover due to the change of the BSS, i.e., handover in a link layer. That is, the mobile node 1 becomes aware that it is positioned in the BSS managed by the access point B 20, and changes its link layer connection with the access point A 10 to a link layer connection with the access point B 20. Referring to the open systems interconnection (OSI) reference model, since the link layer corresponds to a second layer, the handover in the link layer is called a handover in the second layer or an L2 handover for short.

The mobile node 1 accesses a wired network by way of its new access point B 20.

In the communications denoted by 22 in FIG. 1, the mobile node 1 transmits a router solicitation for proxy advertisement (RtSolPr) frame including information that the BSS in which it is positioned has changed, to the access router A 50 by way of the access point B 20. The access router A 50, which has not received the information through any other access router, becomes aware that the mobile node 1 is positioned within its subnet.

In the communications denoted by 23 in FIG. 1, the access router A 50 transmits a proxy router advertisement (PrRtAdv) frame, including information that the subnet has not changed, to the mobile node 1 by way of the access point B 20. The mobile node 1 that receives this frame becomes aware that it is positioned within the subnet managed by the access router A 50. Accordingly, the mobile node 1 does not conduct a handover, i.e., handover in an Internet protocol (IP) layer. Referring to the OSI reference model, since the IP layer corresponds to a third layer, handover in the IP layer is called a handover in the third layer or an L3 handover for short.

In the communications denoted by 24 in FIG. 1, the mobile node 1 receives a beacon signal from the access point B 20. Based on the received beacon signal, the mobile node 1 becomes aware that it is positioned within the BSS managed by the access point B 20. The mobile node 1 accesses a wired network by way of the access point B 20, as it did previously.

In the communications denoted by 31 in FIG. 1, the mobile node 1 receives a beacon signal from the access point C 30. Based on the received beacon signal, the mobile node 1 becomes aware that the BSS in which it is positioned has changed. Accordingly, the mobile node 1 conducts handover due to the change of the BSS, i.e., handover in a link layer. That is, the mobile node 1 becomes aware that it is positioned in the BSS managed by the access point C 30, and changes the link layer connection with the access point 10 A to a link layer connection with the access point C 30. The mobile node 1 accesses a wired network by way of its new access point C 30.

In the communications denoted by 32 in FIG. 1, the mobile node 1 transmits an RtSolPr frame, including information that the BSS in which it is positioned has changed, to the access router A 50 by way of the access point C 30 and the access router B 60. The access router A 50 that receives this information by way of the access router B 60, which is a different access router, becomes aware that the mobile node 1 is not in its subnet.

In the communications denoted by 33 in FIG. 1, the access router A 50 transmits a PrRtAdv frame, including information that the subnet in which the mobile node 1 is positioned has changed, to the mobile node 1 by way of the access router B 60 and the access point C 30. The mobile node 1 that receives this frame becomes aware that the subnet in which it is positioned has changed. Accordingly, the mobile node 1 conducts handover due to the change of the subnet, i.e., handover in an Internet protocol (IP) layer.

In the communications denoted by 41 in FIG. 1, the mobile node 1 receives a beacon signal from the access point D 40. Based on the received beacon signal, the mobile node 1 becomes aware that the BSS in which it is positioned has changed. Accordingly, the mobile node 1 conducts handover due to the change of the BSS, i.e., handover in the link layer. The mobile node 1 becomes aware that it is positioned within the BSS managed by the access point D 40, and changes the link layer connection with the access point C 30 to a link layer connection with the access point D 40. The mobile node 1 accesses a wired network by way of its new access point D 40.

In the communications denoted by 42 in FIG. 1, the mobile node 1 transmits an RtSolPr frame, including information that the BSS in which it is positioned has changed, to the access router B 60 by way of the access point D 40. The access router B 60 that receives this frame (not through any other access router) becomes aware that the mobile node 1 is positioned within its subnet.

In the communications denoted by 43 in FIG. 1, the access router B 60 transmits a PrRtAdv frame, including information that the subnet has not changed, to the mobile node 1 by way of the access point D 40. The mobile node 1 that receives this frame becomes aware that it is positioned within the subnet managed by the access router B 60. Accordingly, the mobile node 1 does not conduct handover due to the change of the subnet, i.e., handover in the IP layer.

As described above, a mobile node communicates with an access router to obtain information of a change of a subnet that it accesses, since it does not know whether the subnet has changed. In other words, the mobile node communicates with the access router in order to determine whether to conduct the handover only in the link layer, or the handovers both in the link layer and the IP layer.

Handover due to movement of a mobile node between homogeneous networks is illustrated in FIG. 1. However, research to support seamless mobility between heterogeneous networks is being conducted.

Especially, wireless technology recently gathering strength as a main art is classified into WLAN (the IEEE 802.11 standard) and cellular. To support mobility between these wireless networks, organizations participating in wireless standardization, including IEEE 802, 3GPP, 3GPP2, ITU-T and IETF, are actively focusing on solving known problems.

Among them, the research on IEEE 802 is the most active, especially, IEEE 802.21 WG and IEEE 802.11 WIEN SG.

IEEE 802.21 WG is focused on standardization to provide media independent solutions for mobility between heterogeneous networks. In particular, it created a new layer 2.5 model between a MAC layer and its upper IP layer, thereby making it possible to support efficient mobility in various wired and wireless environments.

For this, the working group of IEEE 802.21 has been in discussion about a method for realizing a media independent handover (MIH) protocol. In connection with this, the content disclosed in: www.ieee802.org/21 may be referenced.

Even when a mobile node, operating according to the MIH protocol, moves to a heterogeneous network, the mobile node can conduct continuous communication since handover is possible when an access point in the target heterogeneous network supports the MIH protocol.

However, when the mobile node does not support the MIH protocol or when it supports the MIH protocol but the access point in the target heterogeneous network does not support the MIH protocol, handover cannot be conducted.

Accordingly, there is a need for the mobile node to know whether the access point in the target heterogeneous network supports the MIH protocol.

SUMMARY OF THE INVENTION

Accordingly, an aspect of the present invention relates to a method for providing information as to whether, when a mobile node moves to a heterogeneous network, an access point in the heterogeneous network supports the MIH protocol defined in the IEEE 802.21 Specification, and an access point for conducting the method.

According to an aspect of the present invention, there is provided an access point including a wired interface module to receive, through a wired network, indication information indicating whether an access point that manages a neighboring heterogeneous subnet supports a protocol to conduct a media independent handover (MIH), a storage module to store the received indication information, a frame generating module to generate a frame including the stored indication information, and a wireless interface module to transmit the generated frame to a mobile node.

According to another aspect of the present invention, there is provided an information transmitting method including receiving, through a wired network, indication information indicating whether an access point that manages a neighboring heterogeneous subnet supports a protocol to conduct a media independent handover (MIH), storing the received indication information, generating a frame including the stored indication information, and transmitting the generated frame to a mobile node.

According to a further aspect of the present invention, there is provided an access point including a frame generating module to generate a frame including indication information to indicate whether a protocol to conduct a media independent handover (MIH) is supported, and a wireless interface module to transmit the generated frame to a mobile node.

According to a still further aspect of the present invention, there is provided an information transmitting method including generating a frame including indication information to indicate whether a protocol to conduct a media independent handover (MIH) is supported, and transmitting the generated frame to a mobile node.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 is a table showing IEEE 802.11 frame types and subtypes for the MAC frame.

DETAILED DESCRIPTION OF THE EMBODIMENTS

Figure 1:
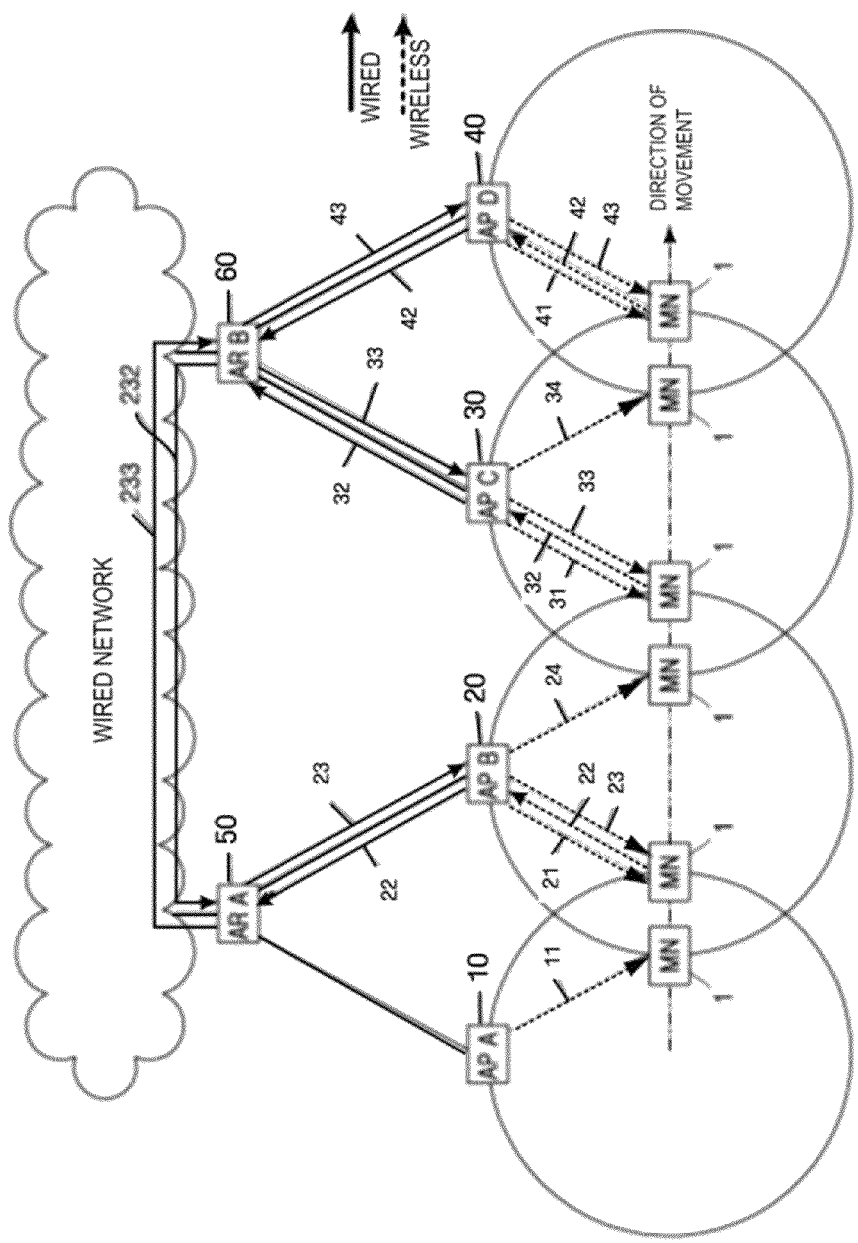
FIG. 1 illustrates a conventional wireless LAN environment.

Advantages and features of the aspects of the present invention and methods of accomplishing the same may be understood more readily by reference to the following detailed description of exemplary embodiments and the accompanying drawings. The aspects of the present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

An aspect of the present invention is described hereinafter with reference to a block diagram or flowchart illustrations of an access point and a method for transmitting MIH protocol information according to exemplary embodiments of the invention. It should be understood that each block of the flowchart, and combinations of blocks in the flowchart can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus creates ways for implementing the functions specified in the flowchart block or blocks.

According to another aspect of the present invention, these computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks.

According to another aspect of the present invention, the computer program instructions may also be loaded onto a computer or other programmable data processing apparatus to cause a series of operations to be performed on the computer or other programmable apparatus to produce a computer implemented process such that the instructions executed on the computer or other programmable apparatus provide operations for implementing the functions specified in the flowchart block or blocks.

According to another aspect of the present invention, each block of the flowchart illustrations may represent a module, segment, or portion of code which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order, depending upon the functionality involved.

Figure 2:
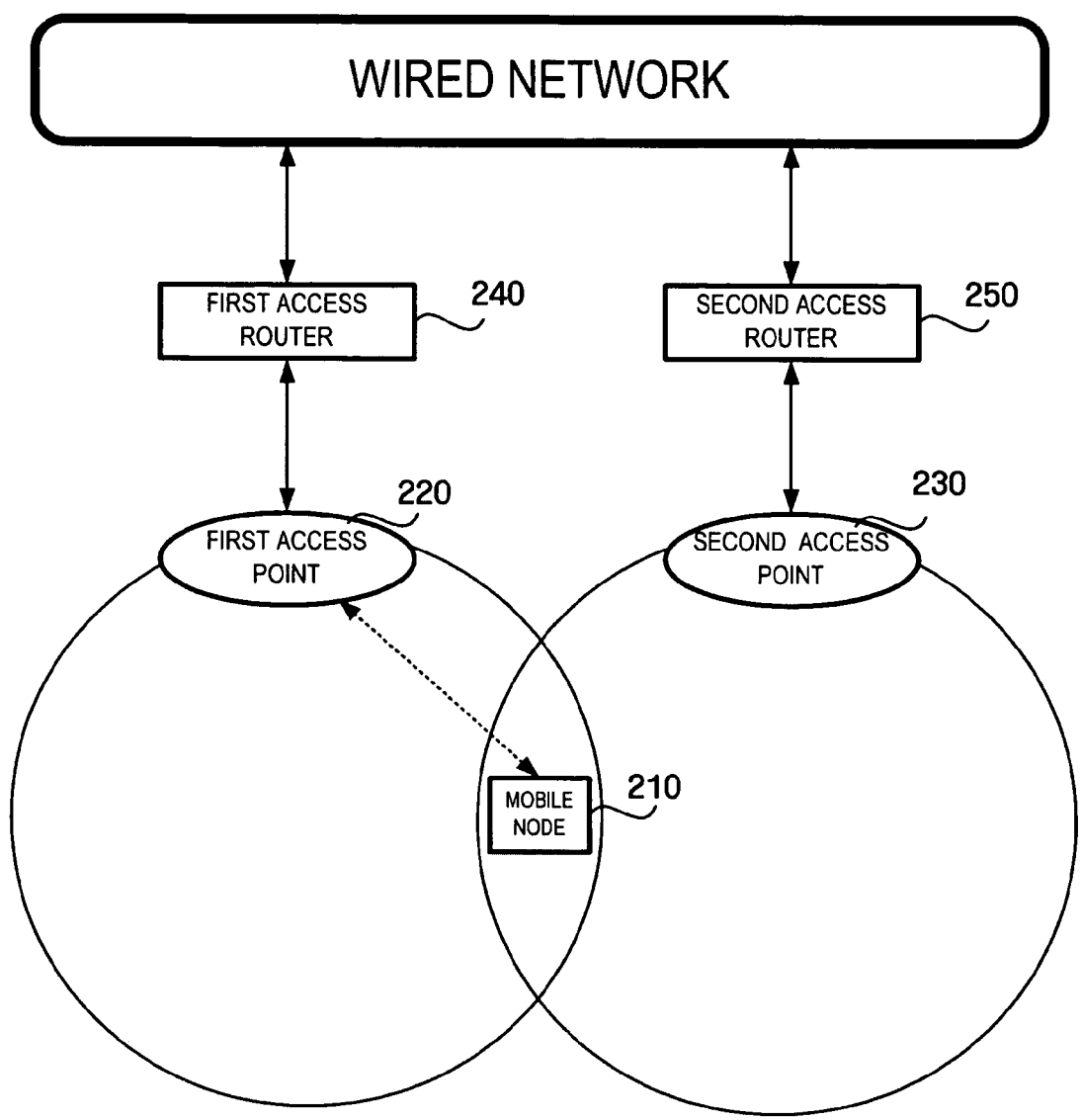
FIG. 2 illustrates a configuration of a system according to an exemplary embodiment of the present invention.

FIG. 2 illustrates a configuration of a system according to an exemplary embodiment of the present invention. The system includes a first access router 240, a second access router 250, a first access point 220, a second access point 230 and a mobile node 210.

The mobile node 210, which can be a mobile phone, a PDA or a notebook computer refers to a node moving between several wireless LANs.

The first access point 220 and the second access point 230 connect the mobile node 210 to respective subnets to which they belong, thereby allowing the mobile node 210 to access a wired network such as the Internet.

The first access router 240 and the second access router 250 provide the mobile node 210 with routing services in their respective subnets, thereby allowing the mobile node 210 to connect to an arbitrary node in each of the subnets using an optimal path. Mutual communications between them can be conducted according to a conventional router communication method.

As illustrated in FIG. 2, it is assumed that the mobile node 210 passes through the subnet managed by the first access point 220 and the subnet managed by the second access point 230, and the respective subnets managed by the first access point 220 and the second access point 230 compose heterogeneous networks.

For example, when the subnet managed by the first access point 220 refers to a BSS defined by the IEEE 802.11 specification, the subnet managed by the second access point 230 may correspond to a cell of a cellular network, but it is not limited to this. Any heterogeneous network managed by the first access point 220 is possible.

It is assumed that the mobile node 210 can support the MIH protocol defined in the IEEE 802.21 specification. Accordingly, when the mobile node 210 moves from the first subnet to a second heterogeneous subnet, the mobile node 210 can continuously conduct communication when the second access point 230 in the second subnet supports the MIH protocol.

The mobile node 210 has to know whether the second access point 230 supports the MIH protocol before it moves to the second subnet. Hereinafter, such information will be referred to as MIH indication information.

The mobile node 210 may receive MIH indication information from the first access point 220, and the first access point 220 may obtain this information from the first access router 240. The first access router 240 may obtain the MIH indication information from the second access router 250 through a wired network.

That is, when the first access router 240 receives the MIH indication information of the second access point 230 from the neighboring second access router 250 through the wired network and transmits the received MIH indication information to the first access point 220, the first access point 220 provides the received MIH indication information to the mobile node 210 belonging to its subnet.

At this time, the first access point 220 generates and transmits a frame to carry MIH indication information to the subnet it manages, whereby the MIH indication information is transmitted to the mobile node 210. An example of this frame will be described later.

Figure 3:
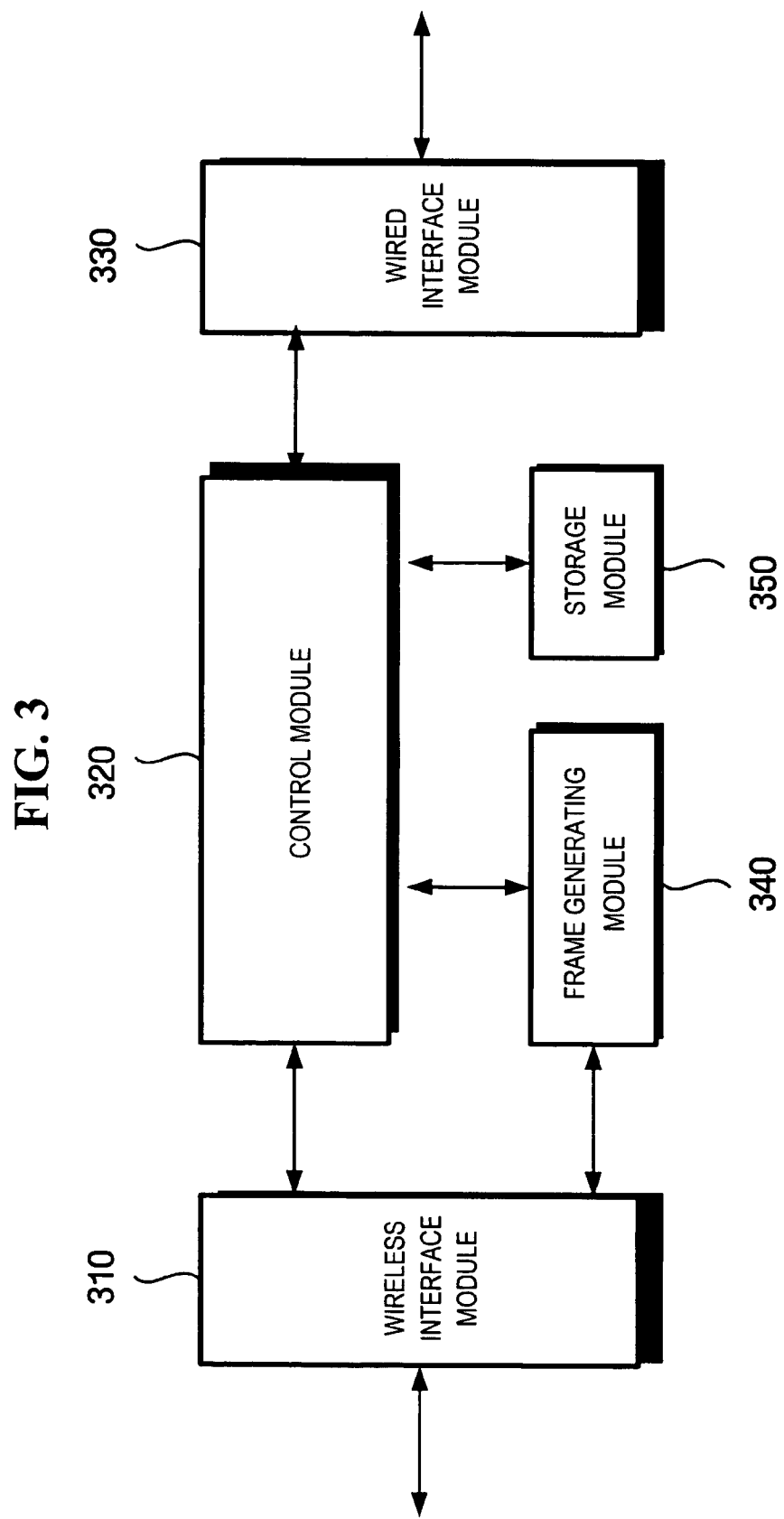
FIG. 3 illustrates a configuration of an access point according to an exemplary embodiment of the present invention.

FIG. 3 illustrates a configuration of an access point that depicts the general configuration of the first access point 220 or the second access point 230 shown in FIG. 2, according to an exemplary embodiment of the present invention.

An access point includes a wireless interface module 310, a wired interface module 330, a frame generating module 340, a storage module 350 and a control module 320.

The wireless interface module 310 refers to a module for communicating with a mobile node belonging to the subnet managed by the access point, and the wired interface module 330 refers to a module for connecting with a wired network by way of an access router. The storage module 350 stores MIH indication information of an access point in the neighboring heterogeneous subnet (received through the wired interface module 330), and the frame generating module 340 generates a predetermined frame including the MIH indication information according to an operation by the control module 320, and controls the wireless interface module 310 in order to transmit the frame to the mobile node. The control module 320 controls the operations of the modules and smoothly coordinates communications between the wired network and the wireless network.

The term "module," as used herein, refers to, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, components and modules may be implemented so as to reproduce one or more CPUs within a device or a secure multimedia card.

Figure 4:
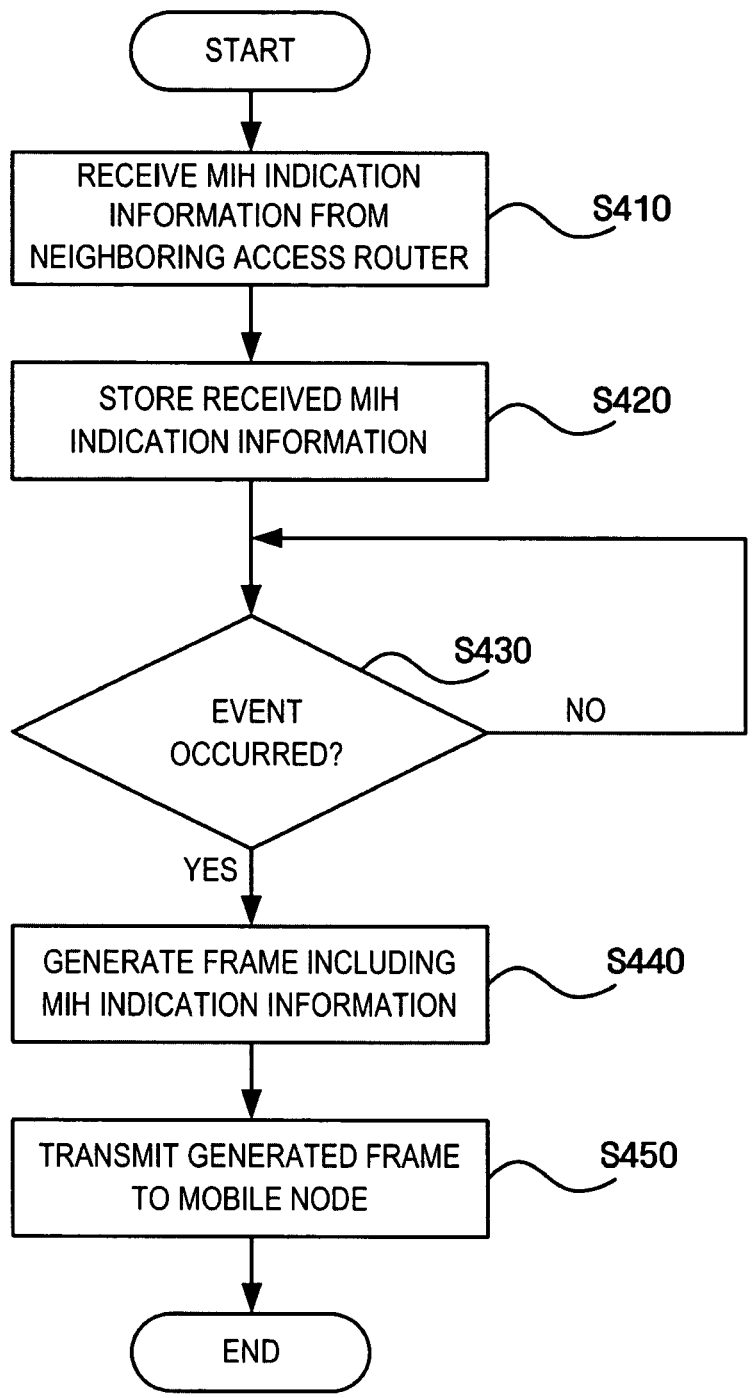
FIG. 4 is a flow chart illustrating a method of transmitting MIH indication information to a mobile node according to an exemplary embodiment of the present invention.

A process where an access point transmits MIH indication information of another access point that manages a neighboring heterogeneous network, i.e., a neighboring heterogeneous subnet, to a mobile node belonging to the network, is illustrated in FIG. 4, and will be described concretely based on the modules illustrated in FIG. 3.

The wired interface module 330 of the access point receives MIH indication information from an access router that conducts routing functions for the neighboring heterogeneous network, the access router being connected to an access router which is connected to the wired interface 330 through a wired network S410. The MIH indication information may be included in the routing information transmitted periodically or non-periodically between access routers.

The control module 320 stores the MIH indication information received through the wired interface module 330 in the storage module 350 S420. The control module 320 may update the MIH indication information stored in the storage module 350 whenever it receives new MIH indication information.

The control module 320 detects the occurrence of a predetermined event S430. The predetermined event implies a state where the MIH indication information stored in the storage module 350 can be transmitted to a mobile node in the subnet managed by the access point.

As an example of the event, a beacon signal defined in the IEEE 802.11 specification is broadcast in the wireless LAN environment, or a response frame to the solicitation from the mobile node may be generated and transmitted.

When an event has occurred, the control module 320 commands the frame generating module 340 to generate a frame including the MIH indication information, and then the frame generating module 340 generates a frame according to the command S440.

The frame generated by the frame generating module 340 is transmitted to a mobile node through the wireless interface module 310 S450.

Figure 5:
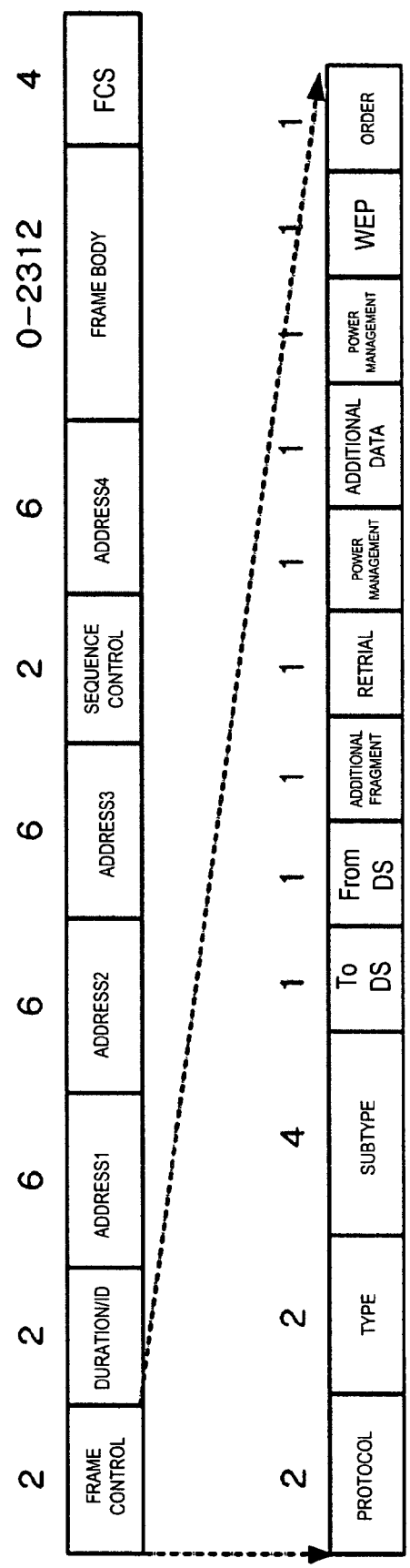
FIG. 5 illustrates a MAC frame used to transmit the MIH indication information according to an exemplary embodiment of the present invention.

An example of a frame that can be used in order for the access point to transmit MIH indication information to the mobile node is a MAC frame defined in the IEEE 802.11 specification, a configuration of which is illustrated in FIG. 5. FIG. 6 is a table showing IEEE 802.11 frame types and subtypes for the MAC frame.

Referring to FIG. 5, the MAC frame includes a 2 byte frame control field, a 2 byte duration/ID field, address fields each having a 48-bit address (address #1, address #2 and address #3), a 2 byte sequence control field, a 6 byte address field (address #4), a frame body having 2,312 bytes at maximum, and a 4 byte frame check sequence (FCS) field.

The frame control field includes a protocol field in which a protocol version such as the IEEE 802.11 MAC version is recorded, a type field and a subtype field to identify types of the frame in use, a ToDS field, a FromDS field, an additional fragment field, a retrial field, a power management field, an additional data field, a power management field, a Wired Equivalent Privacy (WEP) field and a order field in which various parameters for frame control are stored. The types and subtypes of the frame are illustrated in FIG. 6.

The duration/ID field has various uses, as any one type of duration (NAV or network allocation vector) setting, a frame (CFP) transmitted during the non-contention period, and a PS-search frame.

The address field stores parameters for frame movement. Address #1 is used for a receiver, address #2 is used for a transmitter, and address #3 is used for filtering by the receiver.

The sequence control field is used in reassembling fragmented frames and discarding duplicate frames, and includes a 4 bit fragmentation number field and a 12 bit sequence number field.

The frame body field refers to a data field that supports 2,312-bytes at maximum.

The FCS is used when checking the integrity of a frame received from a specific terminal.

Referring to FIG. 6, the various types of frames are classified into a management frame 00, a control frame 01 and a data frame 10. Other frame types 11, not used but reserved for use, may be present.

Frames of each type can be distinguished by 4 bit subtype field values. For example, in the management frame, a frame having a "1000" subtype is a beacon frame and a frame having a "0101" subtype is a probe response frame. In the control frame, a frame having a "1101" subtype is an acknowledgement (ACK) frame, and a frame having a "0000" subtype is a data frame. It can be understood that each type of frame may have other subtypes, not used but reserved for use, by referring to FIG. 6. For example, when the subtype values are "1101," "1110" or "1111" in the management frame, they are reserved for future use.

In the present embodiment, the management frame has the subtype values of "1101," "1110" or "1111" when an access point transmits the MAC frame to a mobile node, thereby indicating whether the access point managing a neighboring heterogeneous subnet supports the MIH protocol.

Referring to FIG. 6, a frame is reserved when a type value of the MAC frame is "11." Accordingly, by designating the subtype value when the type value of the MAC frame is "11," whether a neighboring access point, which manages a heterogeneous subnet, supports the MIH protocol can be known.

As another exemplary embodiment, since the access point periodically broadcasts a beacon frame, which has the "1000" subtype in the management frame, it can transmit the beacon frame including information indicating MIH indication information in the "reserved" field in the frame body of the beacon frame.

As another exemplary embodiment, a probe response frame having the "0101" subtype and including information indicating MIH indication information in the "reserved field" in the frame body may be transmitted to a mobile node.

To date, a method to know whether MIH protocol is supported in the subnet to which a mobile node will be moved has been described. However, the aspect of the present invention is not limited thereto. Whether the MIH protocol can be supported in the subnet to which the mobile node is currently connected can be known.

That is, as far as an access point can support the MIH protocol in its subnet, it can transmit this information to the mobile nodes belonging to its subnet. At this time, the frames described above can be used. Accordingly, the mobile node can know whether the MIH protocol can be supported in the subnet to which it moves as well as in the subnet to which it currently belongs.

As described above, an aspect of the present invention is related to determining in advance whether the MIH protocol is supported in a neighboring heterogeneous subnet to which a mobile node is moved.

Exemplary embodiments of the aspects of the present invention have been described with respect to the accompanying drawings. However, it will be understood by those of ordinary skill in the art that various replacements, modifications and changes in form and details may be made therein without departing from the spirit and scope of the present invention as defined by the following claims. Therefore, it is to be appreciated that the above described embodiments are for purposes of illustration only and are not to be construed as a limitation of the invention.

What is claimed is:

1. A network system comprising:
a first access point including a wired interface module to receive, through a wired network, indication information indicating whether a neighboring second access point supports a protocol to conduct a media independent handover (MIH), and a wireless interface module to transmit the received indication information over a wireless media using a subtype field of a frame control field of a Media Access Control frame indicating that a subnet having the neighboring second access point supports the MIH; and
a mobile node to wirelessly receive the indication information corresponding to the neighboring second access point from the first access point via the subtype field of the frame control field of the Media Access Control frame and to conduct a handover according to the received indication information,
wherein the mobile node requests the indication information of the neighboring second access point from the first access point and the mobile node has contact with but does not have direct access to the wired second access point due to unresolved information about MIH support, and
wherein the indicating whether a neighboring access point supports a protocol to conduct a media independent handover (MIH) is via the management frame having predetermined subtypes.

2. The system of claim 1, wherein the access point further includes a storage module to store the received indication information.

3. The system of claim 1, wherein the access point receives the indication information from the neighboring access point.

4. A network system comprising:
a first access point including a wired interface module to receive, through a wired network, indication information indicating whether a neighboring second access point in a neighboring heterogeneous subnet supports a protocol to conduct a media independent handover (MIH), a storage module to store the indication information, and a wireless interface module to transmit the stored indication information using a subtype field of a frame control field of a Media Access Control frame indicating that a subnet having the neighboring second access point supports the MIH; and
a mobile node to wirelessly request information from the access point of the neighboring access point and wirelessly receive the indication information corresponding to the neighboring second access point in response to the request via the subtype field of the frame control field of the Media Access Control frame,
wherein the mobile node requests the indication information of the neighboring second access point to the first access point and the mobile node has contact with but does not have direct access to the wired second access point due to unresolved information about MIH support, and
wherein the stored indication information is transmitted using a management frame having predetermined subtypes.

5. A method of conducting a handover of a mobile node in a network system, the method comprising:
receiving through a wired interface module from an access router information indicating whether a subnet in an access point supports a protocol for conducting a media independent handover (MIH) of the mobile node;
transmitting through a wireless interface module the received indication information to the mobile node using a subtype field of a frame control field of a Media Access Control frame indicating that a subnet having the neighboring second access point supports the MIH;
conducting the handover of the mobile node to the access point and connecting the mobile node to the access point, according to the received indication information received via the subtype field of the frame control field of the Media Access Control frame, and
requesting the indication information of the subnet of the first access point from a neighboring heterogeneous second access point,
wherein the mobile node has contact with but does not have direct access to the wired second access point due to unresolved information about MIH support, and
wherein the received indication information is transmitted using a management frame having predetermined subtypes.

6. The method of claim 5, wherein the information indicating whether the protocol for conducting the MIH is supported, is received from the access point connected to the mobile node.

7. A method of conducting a handover of a mobile node in a network system, the method comprising:
receiving through a wired interface module from an access router information indicating whether a subnet in an access point supports a protocol for conducting a media independent handover (MIH) of the mobile node;
transmitting through a wireless interface module the received indication information to the mobile node using a subtype field of a frame control field of a Media Access Control frame;

conducting the handover of the mobile node to the access point and connecting the mobile node to the access point, according to the received indication information received via the subtype field of the frame control field of the Media Access Control frame indicating that a subnet having the neighboring second access point supports the MIH, and requesting the indication information of the subnet of the access point from a neighboring heterogeneous access point, wherein the information indicating whether the protocol for conducting the MIH is supported, is received from the access point connected to the mobile node, wherein the access point receives the information, through a wired network, indicating whether the subnet of the access point supports the protocol for conducting the MIH, wherein the mobile node has contact with but does not have direct access to the wired second access point due to unresolved information about MIH support.

8. The method of claim 7, wherein the access point receives the information indicating whether the mobile node supports the protocol for conducting the MIH from a subnet of a neighboring heterogeneous access point.

9. A method of obtaining information of a first access point including wired and wireless interface modules in a network system, the method comprising:

requesting from an access router through the wired interface module, information indicating whether the access point supports a protocol for conducting a media independent handover (MIH) of a mobile node located in a neighboring access point using a subtype field of a frame control field of a Media Access Control frame indicating that a subnet having the neighboring second access point supports the MIH; and transmitting through the wireless interface module the requested information over a wireless media to the mobile node received via the subtype field of the frame control field of the Media Access Control frame, and conducting the handover of the mobile node to the neighboring access second point according to the requested information, wherein the mobile node requests the indication information of the neighboring second access point to the first access point, wherein the mobile node has contact with but does not have direct access to the wired second access point due to unresolved information about MIH support, and wherein the requested information is transmitted using a management frame having predetermined subtypes.

* * * * *